US012725293B2

(12) United States Patent
Fujita

(10) Patent No.: US 12,725,293 B2
(45) Date of Patent: Sep. 1, 2026

(54) POSITIONING DEVICE, MOUNTING DEVICE, POSITIONING METHOD, AND METHOD FOR MANUFACTURING ELECTRONIC COMPONENT

(71) Applicant: Panasonic Intellectual Property Management Co., Ltd., Osaka (JP)

(72) Inventor: Ryo Fujita, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 237 days.

(21) Appl. No.: 18/639,943

(22) Filed: Apr. 18, 2024

(65) Prior Publication Data

US 2024/0265569 A1 Aug. 8, 2024

Related U.S. Application Data

(63) Continuation of application No. PCT/JP2022/028247, filed on Jul. 20, 2022.

(30) Foreign Application Priority Data

Nov. 4, 2021 (JP) ................................ 2021-180146

(51) Int. Cl.
*G06T 7/70* (2017.01)
*G02B 5/04* (2006.01)
(Continued)

(52) U.S. Cl.
CPC .................. *G06T 7/70* (2017.01); *G02B 5/04* (2013.01); *G06T 7/13* (2017.01); *G06V 10/141* (2022.01)

(58) Field of Classification Search
CPC .... G06T 7/70; G06T 7/13; G02B 5/04; G06V 10/141; G01B 11/00; H05K 13/04; H05K 13/08
See application file for complete search history.

(56) References Cited

U.S. PATENT DOCUMENTS

2011/0173793 A1* 7/2011 Motohara ............ G02B 6/4222 29/714
2017/0154864 A1* 6/2017 Hayata ................. B23K 1/0016
2021/0313211 A1* 10/2021 Yamauchi ............... H10P 72/53

FOREIGN PATENT DOCUMENTS

JP 06-300523 10/1994
JP 2001-108863 4/2001
(Continued)

OTHER PUBLICATIONS

International Search Report of PCT application No. PCT/JP2022/028247 dated Aug. 30, 2022.

*Primary Examiner* — Jennifer Mehmood
*Assistant Examiner* — Vaisali Rao Koppolu
(74) *Attorney, Agent, or Firm* — Wenderoth, Lind & Ponack, L.L.P.

(57) ABSTRACT

A positioning device includes a camera, a prism including a first reflection surface and a second reflection surface, and an processor. When the prism is disposed between a joint head and a stage, the first reflection surface reflects, to a side of the camera, light incident from a side of the joint head, and the second reflection surface reflects, to a side of the camera, light incident from a side of the stage. The camera images a camera image including a first image that is an image on the side of the joint head and a second image that is an image on the side of the stage based on light incident from the prism. The processor obtains a position of a first component and a position of a second component based on the camera image.

17 Claims, 14 Drawing Sheets

(51) Int. Cl.
*G06T 7/13* (2017.01)
*G06V 10/141* (2022.01)

(56) References Cited

FOREIGN PATENT DOCUMENTS

| | | | | |
|---|---|---|---|---|
| JP | 2001108863 | A | * | 4/2001 |
| JP | 2001-176934 | | | 6/2001 |
| JP | 4642565 | B | | 3/2011 |
| JP | 2016-092350 | | | 5/2016 |
| JP | 2018-170498 | | | 11/2018 |
| JP | 2018170498 | A | * | 11/2018 |
| WO | 2020/044580 | | | 3/2020 |

* cited by examiner

7
A1
A2
A
8
P1
A3
P2
M2
1
2
9
4
6
5
33
M2
31
32
3
P1
P2
Z
X
Y

A
A1
A3
A2
P1
P2'
P2
X
Y
(c)
(b)
P1(P2')
(a)

A
A1
A3'
A3
A2
N1
N2
X
Y
(c)
A
A1
A3'
A3
A2
P1
P2
X
Y
(b)
A
A1
A3
(A3')
A2
P1
P2
X
Y
(a)

A
A1
A2
A3
35
X
Z
(c)
3
31
33
32
35
Y
X
Z
(b)
3
31
33
32
35
X
Z
Y
(a)

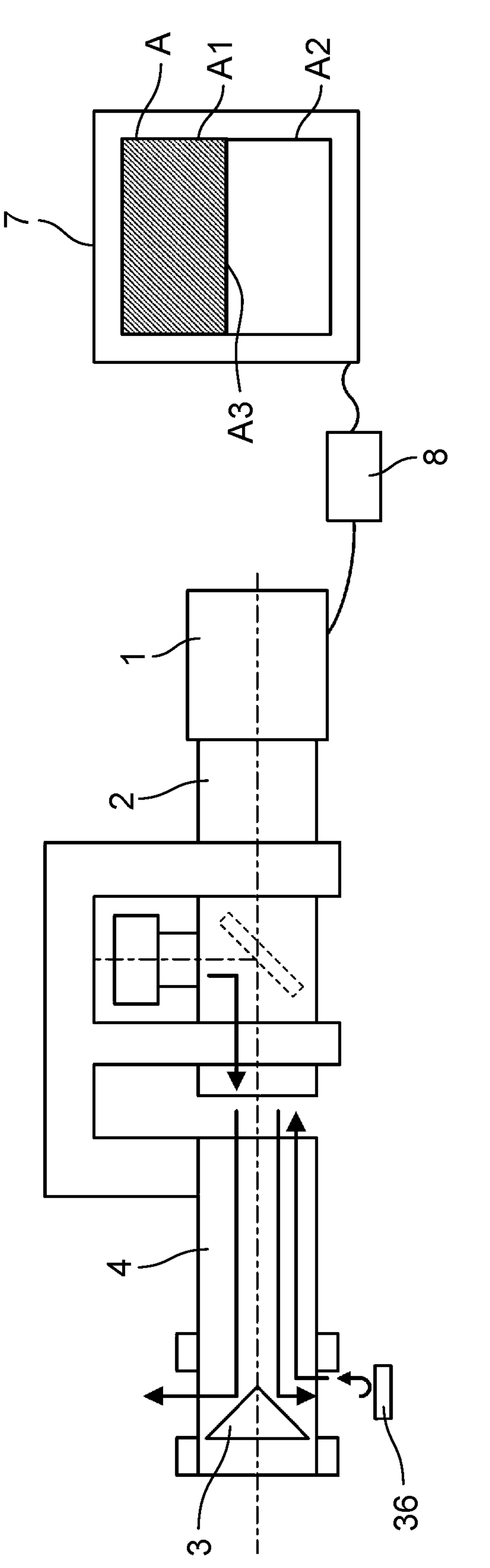
FIG. 10
A
A1
A2
7
A3
8
1
2
4
3
36
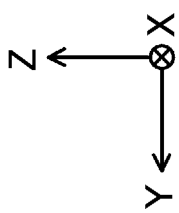
Z
X
Y

A
A1
A2
7
371
371
A3
8
1
2
4
371
371
37
3
Z
X
Y

A
A1
A3'
A3
A2
381
381
Lm
X
Y
(c)
A
A1
A3'
A3
A2
381
381
Lm
X
Y
(b)
A
A1
A3
(A3')
A2
381
381
Lm
X
Y
(a)

(a)
(b)
A
A1
A2
39
7
8
1
2
4
6
5
3
X
Y
Z

POSITIONING DEVICE, MOUNTING DEVICE, POSITIONING METHOD, AND METHOD FOR MANUFACTURING ELECTRONIC COMPONENT

TECHNICAL FIELD

The present disclosure relates to, for example, a positioning device used when positioning of an electronic component or the like is performed, a mounting device, a positioning method, and a method for manufacturing an electronic component.

BACKGROUND ART

Conventionally, when an electronic component or the like is manufactured, a position of a component such as a substrate or a chip component is grasped using a camera, and positioning of each component is performed. At that time, movement for correcting positional deviation of each component is performed based on a positional deviation amount recognized by the camera, and a movement error can be reduced by minimizing the movement amount of a joint head or a stage after recognition correction.

For example, in PTL 1, an optical system is used in which components are arranged immediately above a mounting position of a substrate, and a chip back surface serving as a joint surface to each other and a positioning mark on a substrate surface can be recognized. In particular, in PTL 1, an optical system for an upper field of view for imaging a positioning mark on the chip back surface and an optical system for a lower field of view for imaging a positioning mark on a substrate surface are separately configured, therefore, an optical axis of the upper field of view and an optical axis of the lower field of view after reflection of a prism become coaxial, and the upper field of view and the lower field of view can be coaxially imaged. With such structure, if the horizontal positions of the chip and the substrate are matched from the information imaged by the optical system, the chip can be mounted on the substrate only by lowering the operation of the joint head, therefore, an error due to device movement can be minimized and highly accurate mounting can be performed.

Citation List

Patent Literature

PTL 1: Japanese Patent No. 4642565

SUMMARY OF THE INVENTION

However, in a case where ultra-high precision positioning of less than or equal to 10 μm is performed, only slight thermal expansion of a part or a plurality of components such as a prism, a mirror, and a camera constituting the optical system for chip recognition and the optical system for substrate recognition causes a deviation in a light path, therefore, coaxiality between the light path for chip recognition and the light path for substrate recognition is lost, and positioning accuracy is deteriorated.

An object of the present disclosure is to provide a positioning device, a mounting device, a positioning method, and a method for manufacturing an electronic component that can deter an accuracy decrease in positioning.

In order to achieve the above object, a positioning device according to an exemplary embodiment of the present disclosure is a positioning device that performs positioning of a first component retained by a joint head and a second component placed on a stage when the first component is mounted on the second component, the positioning device including: a prism including a first reflection surface and a second reflection surface; a camera; and a processor, in which in a case where the prism is disposed between the joint head and the stage, the first reflection surface reflects, to the camera side, light incident from the joint head side, and the second reflection surface reflects, to the camera side, light incident from the stage side, the camera images a camera image including a first image that is an image on the joint head side and a second image that is an image on the stage side based on light incident from the prism, and the processor obtains a position of the first component and a position of the second component based on the camera image.

According to the present disclosure, it is possible to deter an accuracy decrease in positioning.

BRIEF DESCRIPTION OF THE DRAWINGS

FIG. 10 is a side view of another example of the positioning device according to the third exemplary embodiment.

DESCRIPTION OF EMBODIMENT

Hereinafter, exemplary embodiments of the present disclosure will be described in detail with reference to the drawings. The following description of preferable exemplary embodiments is merely substantially an example, and is not intended to limit the present disclosure and applications or uses of the present disclosure.

First Exemplary Embodiment

Figure 1:
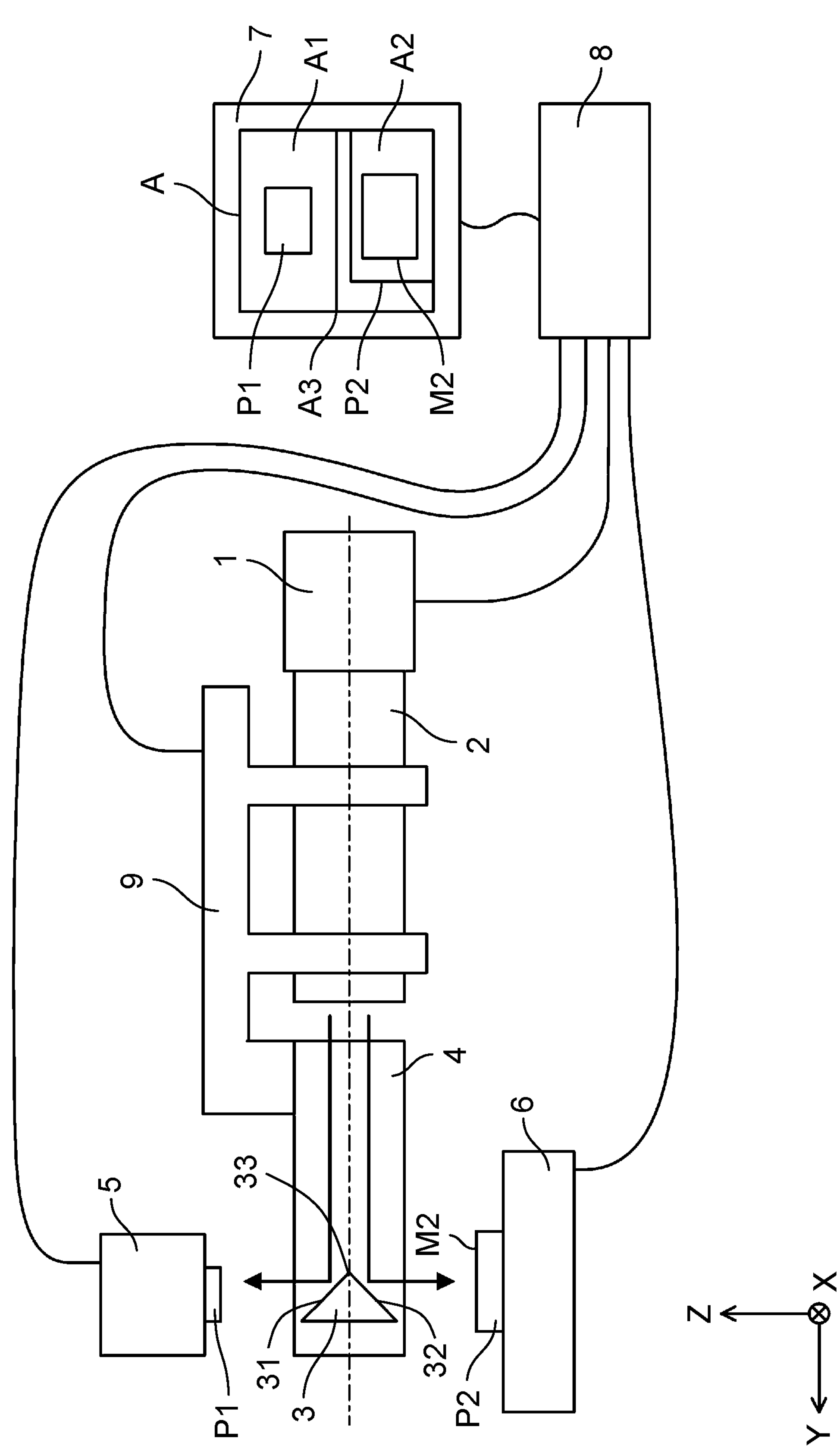
FIG. 1 is a side view of a positioning device according to a first exemplary embodiment.

FIG. 1 illustrates a side view of the positioning device according to the first exemplary embodiment. Note that in the following description, an imaging direction of camera 1 (an optical axis direction of lens 2) is a Y direction, an up-down direction is a Z direction (a first direction), and a direction perpendicular to the Y direction and the Z direction is an X direction.

As illustrated in FIG. 1, the positioning device according to the first exemplary embodiment includes camera 1, lens 2, prism 3, prism retainer 4, joint head 5, stage 6, monitor 7, and processor 8. In one example, processor 8 executes a program stored in a memory.

Camera 1 images, via lens 2 and prism 3, first component P1 retained by joint head 5 and second component P2 placed on stage 6 (details will be described later).

Camera 1 outputs, to processor 8, camera image A having been imaged, and processor 8 outputs camera image A and an arithmetic result to monitor 7.

Lens 2 is attached such that the optical axis matches an imaging direction of camera 1. Lens 2 is desirably a telecentric optical system in which a change in position is small even if an in-focus position is slightly deviated, but this is not the case when the workpiece conveyance accuracy to the in-focus position is high.

Prism 3 is disposed on an optical axis of lens 2 (imaging direction of camera 1). In prism 3, first reflection surface 31 and second reflection surface 32 are formed via boundary line 33. First reflection surface 31 and second reflection surface 32 are formed at an angle of 90°, for example. First reflection surface 31 is formed to form an angle of 45° with respect to the Z axis so as to reflect the light incident from joint head 5 in the optical axis direction of lens 2. Second reflection surface 32 is formed to form an angle of 45° with respect to the Z axis so as to reflect the light incident from stage 6 in the optical axis direction of lens 2. Note that the angle between first reflection surface 31 and second reflection surface 32 needs not be the angle exemplified above, and may be any angle as long as the following configuration can be achieved.

Prism retainer 4 retains prism 3. In the present embodiment, prism 3 is bonded to prism retainer 4 with an adhesive, whereby prism retainer 4 retains prism 3, but prism 3 may be retained by another retention method (e.g., causing prism retainer 4 to retain prism 3).

As illustrated in FIG. 1, lens 2 and prism retainer 4 are retained by optical unit base 9. Note that a position adjustment mechanism such as focusing may be given between lens 2 and optical unit base 9. A fine position adjustment mechanism may be given between prism retainer 4 and optical unit base 9. In the present embodiment, lens 2 and prism retainer 4 are fixed by identical optical unit base 9, but optical unit base 9 may be installed for each of lens 2 and prism retainer 4.

As described above, first component P1 is retained by joint head 5, and second component P2 is placed on stage 6. For example, first component P1 is a chip component, and second component P2 is a substrate. The first component and the second component are parts of a finished product such as an electronic component. First component P1 and second component P2 are picked up by, for example, a supply head (not illustrated), and then retained and placed on joint head 5 and stage 6, respectively.

Here, the first light path from camera 1 to first component P1 on joint head 5 via lens 2 and first reflection surface 31 of prism 3 and the second light path from camera 1 to second component P2 on stage 6 via lens 2 and second reflection surface 32 of prism 3 have an identical light path length.

Monitor 7 displays camera image A imaged by camera 1. Camera image A includes first image A1 that is an image on joint head 5 side and second image A2 that is an image on stage 6 side. As illustrated in FIG. 1, first image A1 and second image A2 are displayed side by side in the up-down direction across boundary A3. Boundary A3 is an image corresponding to boundary line 33 of prism 3. Since prism 3 is disposed such that boundary line 33 matches the optical axis direction of lens 2, boundary A3 is positioned at the center of camera image A.

Processor 8 calculates a relative position of first component P1 and second component P2 based on camera image A output from camera 1, and executes the following positioning processing.

Note that the optical system (hereinafter, may be simply called "optical system") including camera 1, lens 2, prism 3, and prism retainer 4, is movable in the X direction and the Y direction. Joint head 5 and stage 6 are movable in the X direction, the Y direction, and a rotation direction about the Z axis.

Since first component P1 and second component P2 (hereinafter, first component P1 and second component P2 may be called "workpieces") are disposed at a focal position of lens 2, and prism 3 is disposed between lens 2 and the workpiece on the optical axis, blurring occurs at boundary A3 of an obtained image. In a case where the position of prism 3 is close to lens 2, "blurring" of boundary A3 of camera image A increases, and therefore the position recognition accuracy of boundary A3 decreases. In the present system that calculates the relative position between first component P1 and second component P2 based on boundary A3 described later, a positional accuracy decrease in boundary A3 leads to a decrease in positioning accuracy between first component P1 and second component P2. Therefore, in the present disclosure, prism 3 is disposed very close to first component P1 and second component P2 in the first light path and the second light path. Specifically, prism 3 is disposed such that the distance between prism 3 and first component P1 and the distance between prism 3 and second component P2 becomes shorter than the distance between prism 3 and lens 2. This can reduce the "blurring" of boundary A3. The relative position between first component P1 and second component P2 can be reduced. Furthermore, by bringing prism 3 and the workpiece close to each other, even if prism 3 is slightly deviated due to thermal distortion or the like, it is possible to minimize the influence of the positional deviation of the workpiece derived from optical axis blurring, therefore it is possible to finally reduce the movement amount of each component after correction and it is possible to reduce an error in positioning correction.

(Regarding Operation of Positioning Device)

Figure 2:
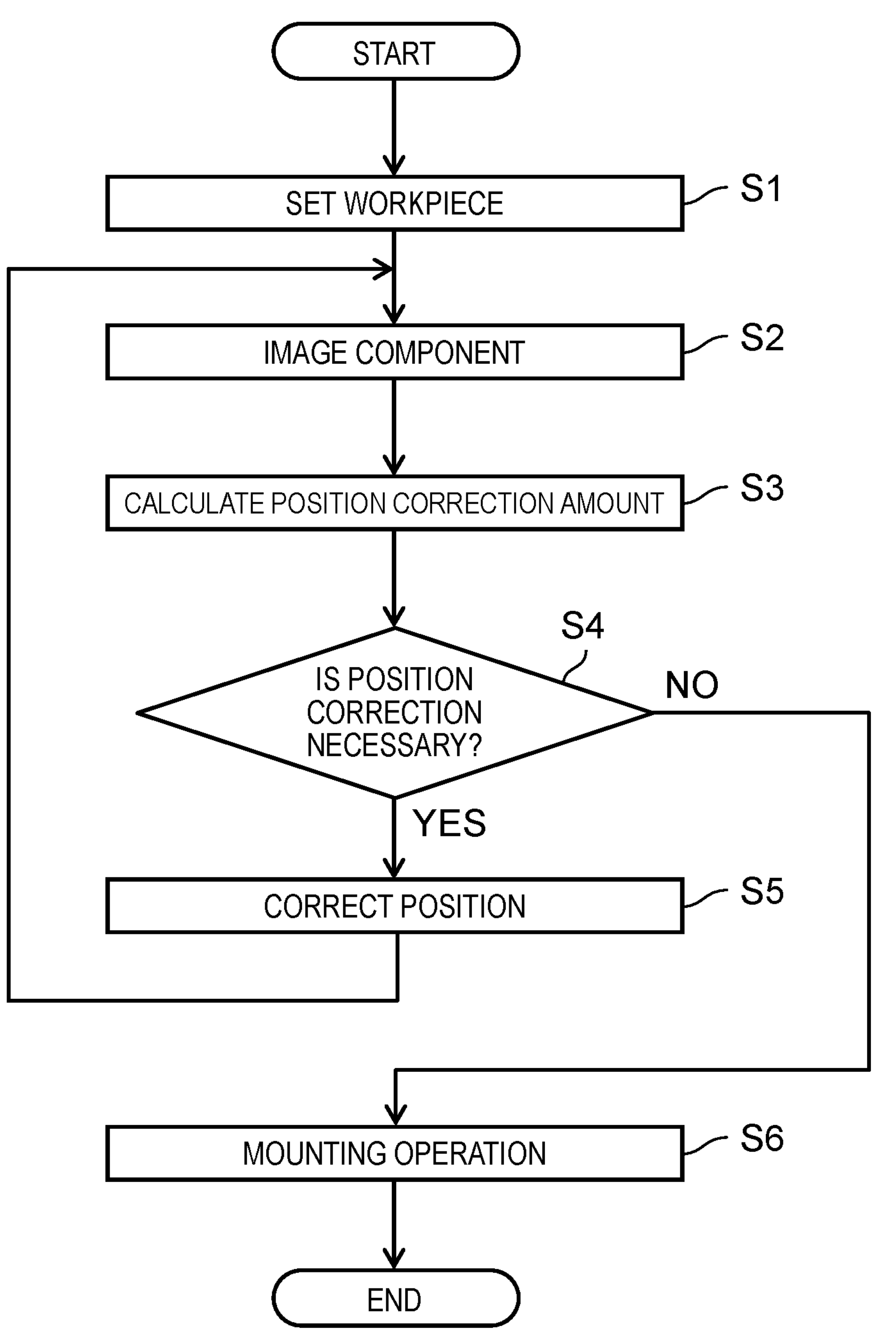
FIG. 2 is a flowchart for explaining an operation of the positioning device according to the first exemplary embodiment.

FIG. 2 is a flowchart for explaining the operation of the positioning device according to the first exemplary embodiment.

First, the workpiece is set in the positioning device (step S1). Specifically, by a supply head not illustrated, first component P1 is retained by joint head 5, and second component P2 is placed on stage 6. At this time, the surface of first component P1 and the surface of second component P2 are each given an alignment point. First component P1 and second component P2 are retained and placed on joint head 5 and stage 6 such that these alignment points face each other. Note that this alignment point is, for example, a mark or an electrode in a case of a flip chip bonder. In a case of the flip chip bonder, first component P1 is picked up by the supply head, and then flipped upside down and retained by joint head 5. On the other hand, in a case of a die bonder type, after picked up by the supply head, first component P1 is retained by joint head 5 without being flipped upside down. Note that in the die bonder type, joint head 5 may directly pick up first component P1 from a wafer without using the supply head.

Camera 1 images first component P1 and second component P2 (step S2). Specifically, camera 1, lens 2, prism 3, and prism retainer 4 are moved, and prism 3 is disposed between first component P1 (joint head 5) and second component P2 (stage 6). Then, camera 1 outputs, to processor 8, camera image A in which first component P1 and second component P2 are imaged. Note that camera 1 may separately image or may simultaneously image first image A1 and second image A2. For example, when first image A1 and second image A2 are imaged at a time, one of the images may become white or may become black. In a case where first image A1 and second image A2 have different imaging conditions such as illumination luminance, a shutter speed, a camera gain, and a ratio between coaxial light and oblique light, camera 1 may image first image A1 and second image A2 in separate two times.

Figure 3:
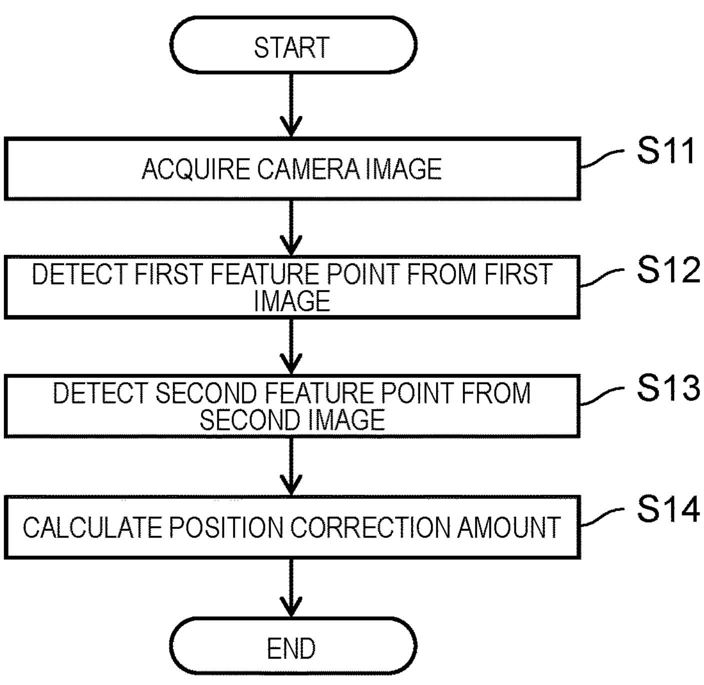
FIG. 3 is a flowchart showing calculation processing of a position correction amount according to the first exemplary embodiment.

Processor 8 obtains the relative position between first component P1 and second component P2 based on first image A1 and second image A2 included in camera image A, and calculates the position correction amount between first component P1 and second component P2 (step S3). Specifically, the processing of FIG. 3 is performed (details will be described later).

Processor 8 determines whether or not position correction is necessary based on the calculated position correction amount (step S4). When the position correction amount is greater than or equal to a predetermined value, processor 8 determines that the position correction is necessary (Yes in step S4), and corrects (moves) the position between first component P1 and second component P2 based on the position correction amount calculated in step S3 (step S5). Thereafter, the process returns to step S2.

On the other hand, when the position correction amount is less than or equal to the predetermined value, processor 8 determines that the position correction is unnecessary (Yes in step S4) and performs a mounting operation (step S6). Specifically, joint head 5 is moved in the Z direction toward stage 6, and first component P1 is placed on second component P2.

(Regarding Calculation of Position Correction Amount)

FIG. 3 is a flowchart showing the calculation processing of the position correction amount according to the first exemplary embodiment. FIG. 3 is executed by processor 8 to calculate the position correction amount in step S3.

First, upon acquiring camera image A (step S11), processor 8 detects first feature point M1 of first component P1 from first image A1 (step S12). Processor 8 detects second feature point M2 of second component P2 from second image A2 (step S13). These feature points are, for example, parts (such as corner parts) that become features of corresponding components, marks given to the surface of the component, and the like.

Figure 4:
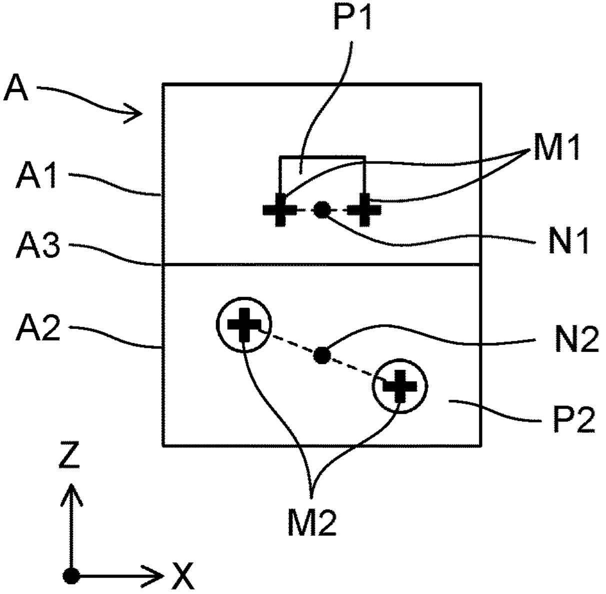
FIG. 4 is a view for explaining the calculation processing of the position correction amount according to the first exemplary embodiment.

In the example of FIG. 4, since the feature point of first component P1 is set at a corner part, processor 8 detects, as first feature point M1, an intersection of two straight lines constituting the corner part. Since the feature point of second component P2 is set to a circular mark, processor 8 detects, as second feature point M2, the center part of the circle.

In the present embodiment, processor 8 detects the center point of two first feature points M1 as reference position N1 of first component P1, and detects the center point of two second feature points M2 as reference position N2 of second component P2. Processor 8 obtains a relative angle between a first angle reference line that is a straight line connecting two first feature points M1 and a second angle reference line that is a straight line connecting two second feature points M2. Processor 8 calculates the position correction amount based on reference positions N1 and N2 and the relative angle between the first angle reference line and the second angle reference line (step S14).

Figure 5:
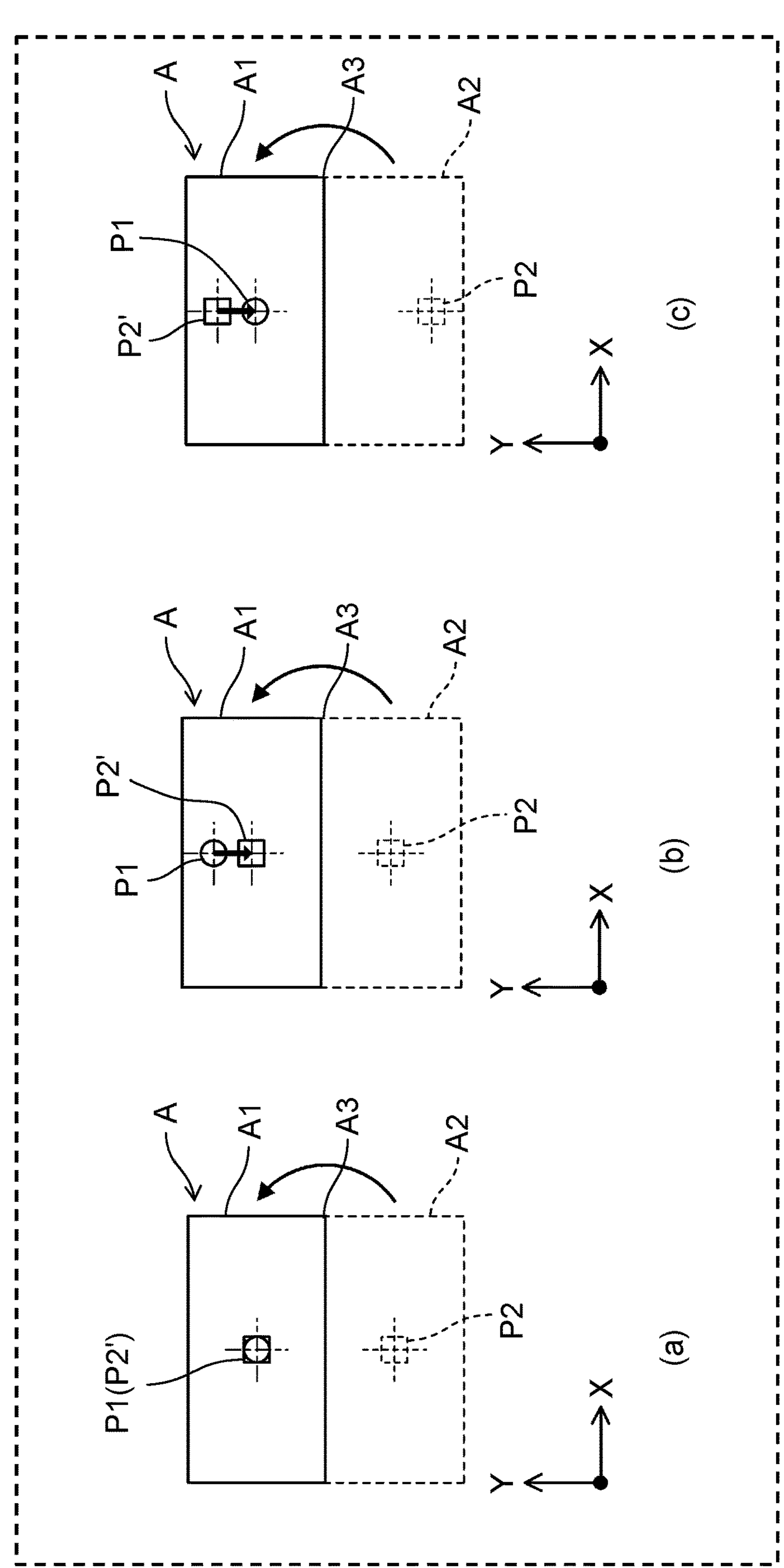
FIG. 5 is a view for explaining the calculation processing of the position correction amount according to the first exemplary embodiment.

FIG. 5 is a view for explaining the calculation processing of the position correction amount according to the first exemplary embodiment. In each of camera images A of FIGS. 5(*a*) to 5(*c*), first component P1 and second component P2 are displayed.

As illustrated in FIG. 5, in camera image A, first image A1 and second image A2 are displayed side by side in up and down via boundary A3 extending in the X direction. Here, considering the relationship between each image and an actual coordinate system, first image A1 and second image A2 match in the X direction and are reversed in the Y direction. That is, by folding back second image A2 in the Y direction with reference to boundary A3, it is possible to match the coordinates of first image A1 and second image A2 with the actual coordinate system. Note that in FIGS. 5(*a*) to 5(*c*), P2' indicates the position of second component P2 when second image A2 is folded back in the Y direction with reference to boundary A3.

For example, in FIG. 5(*a*), when second image A2 is folded back in the Y direction with reference to boundary A3, the position of first component P1 and the position of second component P2 match, and therefore the position correction amount becomes 0 (no correction).

In FIG. 5(*b*), when second image A2 is folded back in the Y direction with reference to boundary A3, first component P1 is positioned in the +Y direction relative to second component P2, and therefore the position correction amount is obtained such that first component P1 moves in the −Y direction.

In FIG. 5(*c*), when second image A2 is folded back in the Y direction with reference to boundary A3, first component P1 is positioned in the −Y direction relative to second component P2, and therefore the position correction amount is obtained such that first component P1 moves in the +Y direction.

After the position correction amount is obtained as described above, step S4 and the subsequent steps are executed.

As described above, when prism 3 is disposed between joint head 5 and stage 6, first reflection surface 31 reflects, to camera 1 side, light incident from joint head 5 side, and second reflection surface 32 reflects, to camera 1 side, light incident from stage 6 side. Based on light incident from prism 3, camera 1 images camera image A including first image A1 that is an image on joint head 5 side and second image A2 that is an image on stage 6 side. Processor 8 obtains the position of first component P1 and the position of second component P2 based on camera image A. This enables the position of first component P1 and the position of second component P2 to be recognized by one prism and one camera, and therefore it is possible to reduce the number of components constituting the optical system. Therefore, since it is possible to deter an occurrence of thermal expansion of a component constituting the optical system, it is possible to deter a decrease in positioning accuracy.

Note that in the first exemplary embodiment, there is a case where the size of first component P1 (or second component P2) is too large for first component P1 (or second component P2) to be fitted to first image A1 (or second image A2). In this case, the optical system such as camera 1 may be appropriately moved in the X direction and the Y direction to generate a plurality of first images A1 (or a plurality of second images A2), and based on these images, processor 8 maydetect first feature point M1 (or second feature point M2).

Second Exemplary Embodiment

Figure 6:
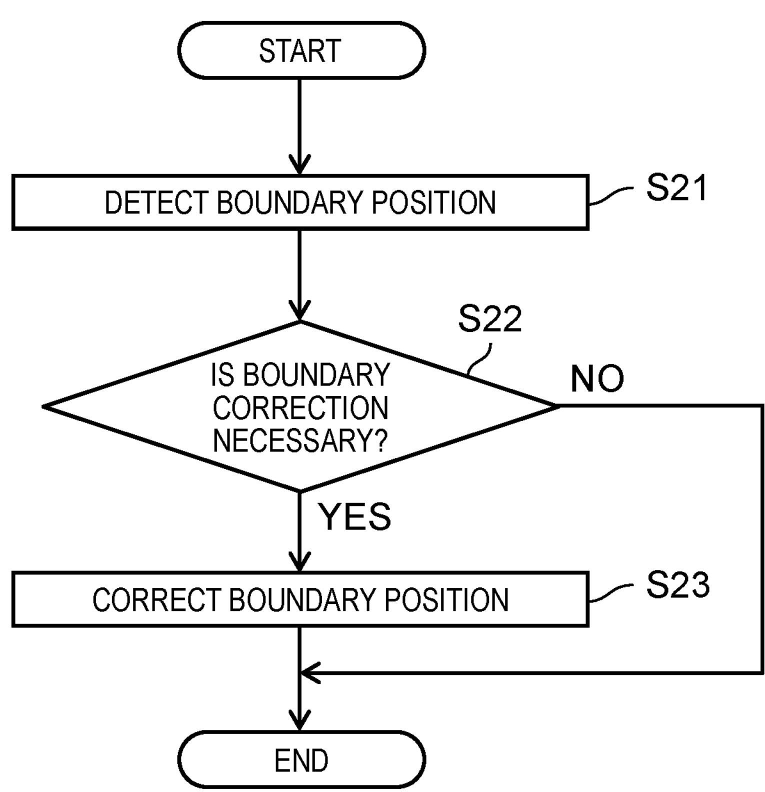
FIG. 6 is a flowchart showing correction processing of a boundary position according to a second exemplary embodiment.

FIG. 6 is a flowchart showing the correction processing of the boundary position according to the second exemplary embodiment. The operation shown in FIG. 6 is executed by processor 8 before performing the operation of FIG. 2. In the first exemplary embodiment, since camera 1 is installed so that the upward direction of camera 1 matches the Z direction, and boundary line 33 between the two reflection surfaces (first reflection surface 31 and second reflection surface 32) of prism 3 is arranged so as to become on the optical axis center of lens 2 and parallel to the X axis, boundary A3 (boundary line 33 of prism 3) in camera image A is displayed at the center in the up-down direction of camera image A so as to match the X direction. (See each figure in FIG. 4). However, there is a case where boundary A3 is displayed deviated from the position (hereinafter, also called "reference position of boundary A3") of FIG. 4 due to thermal expansion of a component constituting the optical system (camera 1, lens 2, and the like). When the processing of FIGS. 2 and 3 is performed with reference to deviated boundary A3, positioning (calculation of the correction amount) of first component P1 and second component P2 can no longer be accurately performed. Therefore, in the second exemplary embodiment, deviation of boundary A3 is corrected by executing the correction processing of the boundary position in FIG. 6. Note that in FIGS. 7(*a*) to 7(*c*), the boundary before the position correction is indicated by A3, and the boundary after the position correction is indicated by A3'.

First, processor 8 detects boundary A3' from camera image A (step S21). For example, processor 8 detects a lower side of first image A1 and an upper side of second image A2, and sets an intermediate position thereof as a boundary A3'. In this case, processor 8 may separately image first image A1 and second image A2 and detect the lower side of first image A1 and the upper side of second image A2. In camera image A, processor 8 may detect the upper side and the lower side of a region of boundary line 33 of prism 3 (the region where blurring occurs) from a background image of the workpiece, and set the intermediate position as boundary A3'.

Processor 8 determines whether or not processing of correcting boundary A3 is necessary (step S22). Specifically, in a case where boundary A3' does not match the reference position of boundary A3 in camera image A, processor 8 determines that the processing of correcting boundary A3 is necessary.

When determining that the processing of correcting boundary A3 is unnecessary (No in step S22), processor 8 ends the processing. When determining that the processing of correcting boundary A3 is necessary (Yes in step S22), processor 8 performs boundary position correction (step S23).

Figure 7:
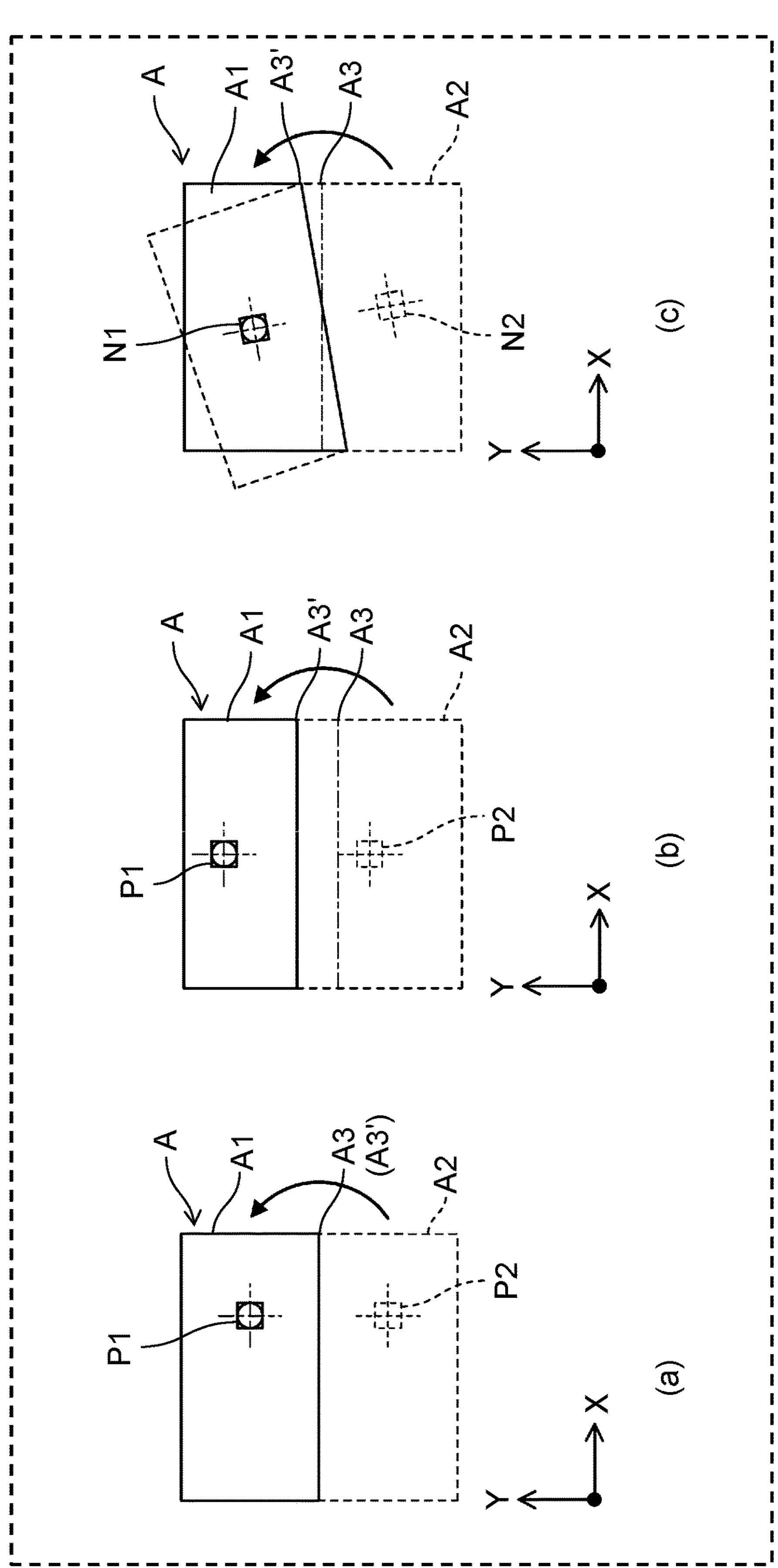
FIG. 7 is a view for explaining the correction process of the boundary position according to the second exemplary embodiment.

In the example of FIG. 7(*a*), since boundary A3' matches the reference position of boundary A3 in camera image A, it is determined that the position correction of boundary A3 is unnecessary (No in step S22). In this case, processor 8 executes the processing of FIG. 2 without performing the position correction processing of boundary A3.

In the example of FIG. 7(*b*), boundary A3' is deviated in the +Y direction as compared with the reference position of boundary A3. For example, due to the fact that the optical axis of lens 2 is deviated in the Z direction, camera image A1 becomes as illustrated in FIG. 7(*b*).

In the example of FIG. 7(*c*), boundary A3' is deviated in the rotation direction with respect to the center of camera image A1 as compared with the reference position of boundary A3. For example, due to the fact that the optical axis of lens 2 rotates about the Y axis, camera image A1 becomes as illustrated in FIG. 7(*c*).

In FIGS. 7(*b*) and 7(*c*), since boundary A3' does not match the reference position of boundary A3 in camera image A, processor 8 determines that position correction of boundary A3 is necessary (Yes in step S22). Then, processor 8 performs position correction processing of setting the position of boundary A3' to the position of boundary A3 displayed in camera image A. Due to this, processing such as calculation (processing of folding back second image A2 in the Y direction with reference to boundary A3 to match the coordinates of first image A1 and second image A2 with the actual coordinate system, and the like) of the position correction amount in step S13 performed thereafter is performed with reference to the position of boundary A3', and therefore, even if a deviation occurs in boundary A3 due to thermal expansion of a component constituting the optical system of camera 1 and lens 2, highly accurate position correction of the workpiece can be performed.

Note that calculation of the position correction amount in step S13 is greatly affected by the position of boundary A3. When the plurality of first components P1 are mounted on second component P2, the position of boundary A3 may change due to thermal expansion of the components constituting the optical system during a plurality of times of mounting operation. Therefore, it is preferable that the processing of FIG. 6 be performed every predetermined number of times of mounting operation or every predetermined period. In this case, the frequency of performing the processing of FIG. 6 is determined based on the temperature change of the positioning device, the ease of positional deviation of boundary A3, the manufacturing speed of the finished product, and the like. The processing of FIG. 6 is desirably a method capable of detecting boundary A3' with high accuracy, but in a case where correction is necessary at a high frequency, use in combination with a simple method is practical. It is desirable to perform the operation of FIG. 6 also immediately before the mounting operation, such as when the operation is restarted after being stopped for a long time.

Third Exemplary Embodiment

Figure 8:
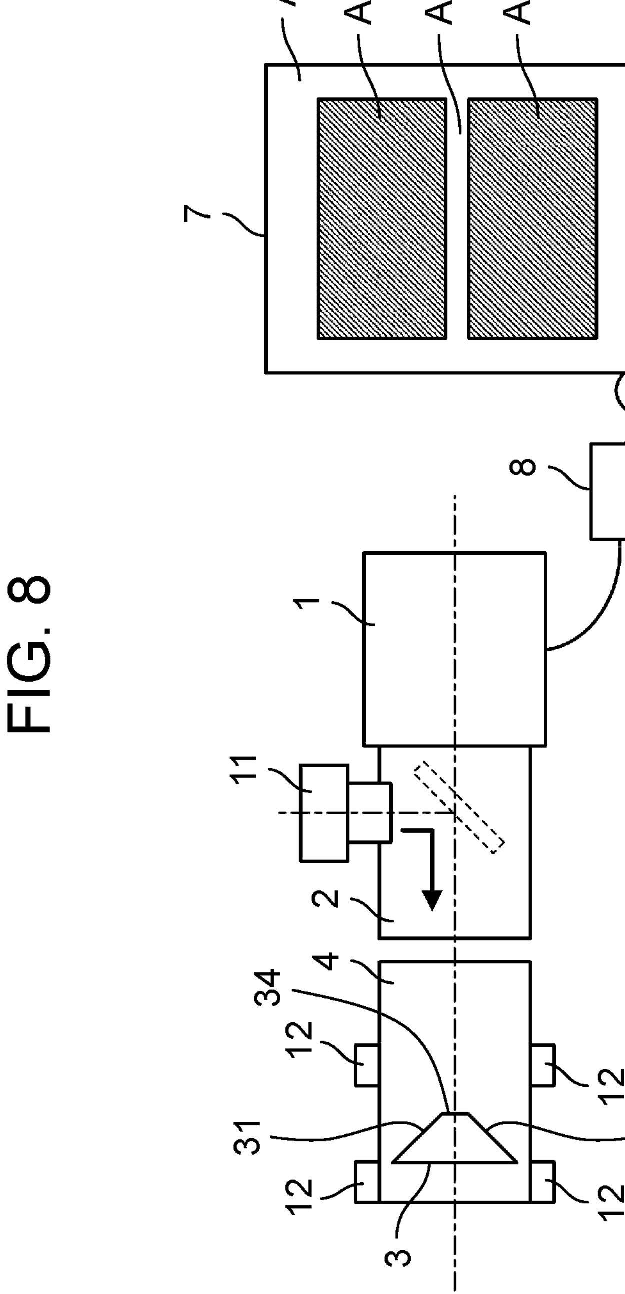
FIG. 8 is a side view of a positioning device according to a third exemplary embodiment.
Figure 8:
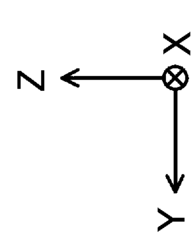

FIG. 8 illustrates a side view of the positioning device according to the third exemplary embodiment. The positioning device of FIG. 8 is configured substantially similarly to that of FIG. 1, but further includes coaxial illumination 11 and oblique light illumination 12 (first illumination).

Coaxial illumination 11 irradiates prism 3 with light in the Y direction, thereby irradiating first component P1 and second component P2 with light from the Z direction. Oblique light illumination 12 irradiates first component P1 and second component P2 with light from an oblique direction. Clearer camera image A can be imaged by coaxial illumination 11 and oblique light illumination 12.

Here, prism 3 has third reflection surface 34 between first reflection surface 31 and second reflection surface 32. Third reflection surface 34 is a plane having a predetermined width in the Z direction and extending in the X direction, and is formed on prism 3 in place of boundary line 33. Due to third reflection surface 34 being formed on prism 3, boundary A3 is more clearly displayed in camera image A. For example, in a state where there is no object displayed in first image A1 and second image A2, coaxial illumination 11 is turned on to image camera 1. Due to this, as illustrated in FIG. 8, first image A1 and second image A2 become black images, and boundary A3 is displayed as a white line therebetween. By setting this white line as boundary A3, it is possible to more reliably perform the processing of FIG. 6.

Note that the width in the Z direction of third reflection surface 34 is preferably such that light reflected by third reflection surface 34 has one or more pixels in camera image A1 and less than 10% in the entire image. As long as boundary A3 can be detected, the width in the Z direction of third reflection surface 34 may be less than one pixel.

Modification 1

Figure 9:
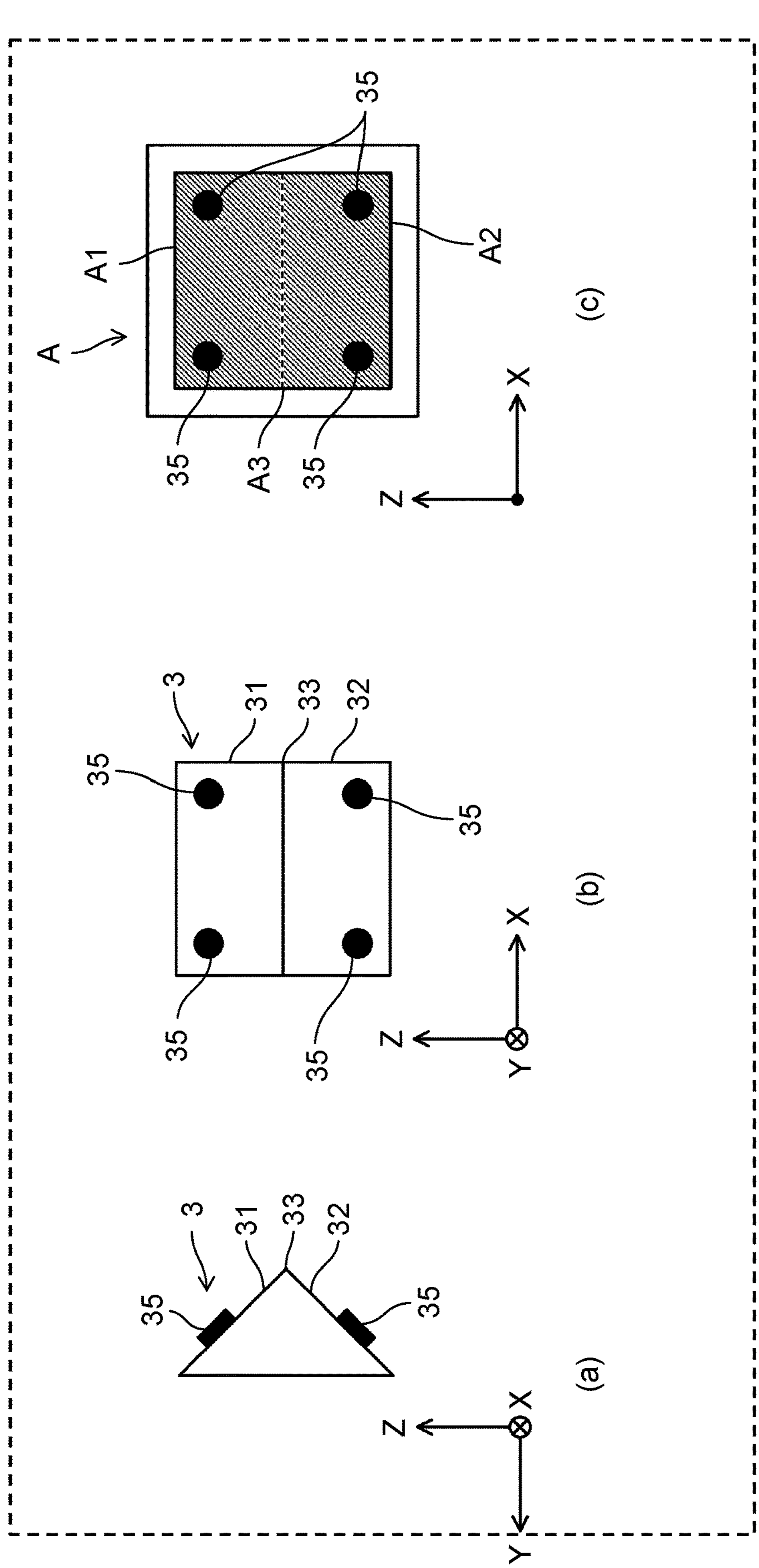
FIG. 9 is a view for explaining another example of a prism according to the third exemplary embodiment.

FIG. 9 is a view for explaining another example of the prism according to the third exemplary embodiment. Specifically, FIG. 9(*a*) illustrates a side view of prism 3, and FIG. 9(*b*) illustrates a view of prism 3 viewed from lens 2 side.

In this modification, prism 3 is given mark 35 (first mark). Specifically, first reflection surface 31 and second reflection surface 32 are each given two marks 35. Marks 35 are arranged at equal intervals with each other in the Z direction with reference to boundary line 33.

FIG. 9(*c*) is camera image A when prism 3 is imaged in a state where there is no object displayed in first image A1 and second image A2. As illustrated in FIG. 9(*c*), since camera image A displays mark 35, even in a case where it is difficult to detect boundary A3, it is possible to estimate that boundary A3 exists at the center of two marks 35 arranged side by side in the up-down direction in the drawing, and thus, it is possible to detect boundary A3.

Note that the position, type, and number of marks 35 are not limited to the example of FIG. 9, and can be appropriately selected. Mark 35 may be a low reflection member displayed with low luminance on camera image A, or may be a high reflection member displayed with high luminance on camera image A.

Modification 2

FIG. 10 illustrates a side view of another example of the positioning device according to the third exemplary embodiment.

In this modification, reflection plate 36 is disposed on stage 6 side in order to detect boundary A3 (boundary line 33) of camera image A. For example, in a case where camera 1 images camera image A in a state where there is no object displayed in first image A1 and second image A2, there is no object on joint head 5 side, and thus first image A1 displays a black image. On the other hand, since reflection plate 36 is disposed on stage 6 side, the second image displays a white image. Since it is possible to estimate that the boundary between the black image (first image A1) and the white image (second image A2) at this time is boundary A3 corresponding to boundary line 33, it is possible to detect boundary A3.

Note that in place of reflection plate 36, illumination (second light source) that irradiates prism 3 with light may be installed. Reflection plate 36 may be disposed on joint head 5 side.

Reflection plate 36 may be installed in each of the up-down direction of prism 3, or illumination (second light source) may be installed in each of the up-down direction of prism 3. In this case, as described above, processor 8 detects the lower side of first image A1 and the upper side of second image A2, and sets the intermediate position thereof as boundary A3. Note that processor 8 may separately image first image A1 and second image A2, detect the lower side of first image A1 and the upper side of second image A2, and set the intermediate position thereof as boundary A3.

Modification 3

Figure 11:
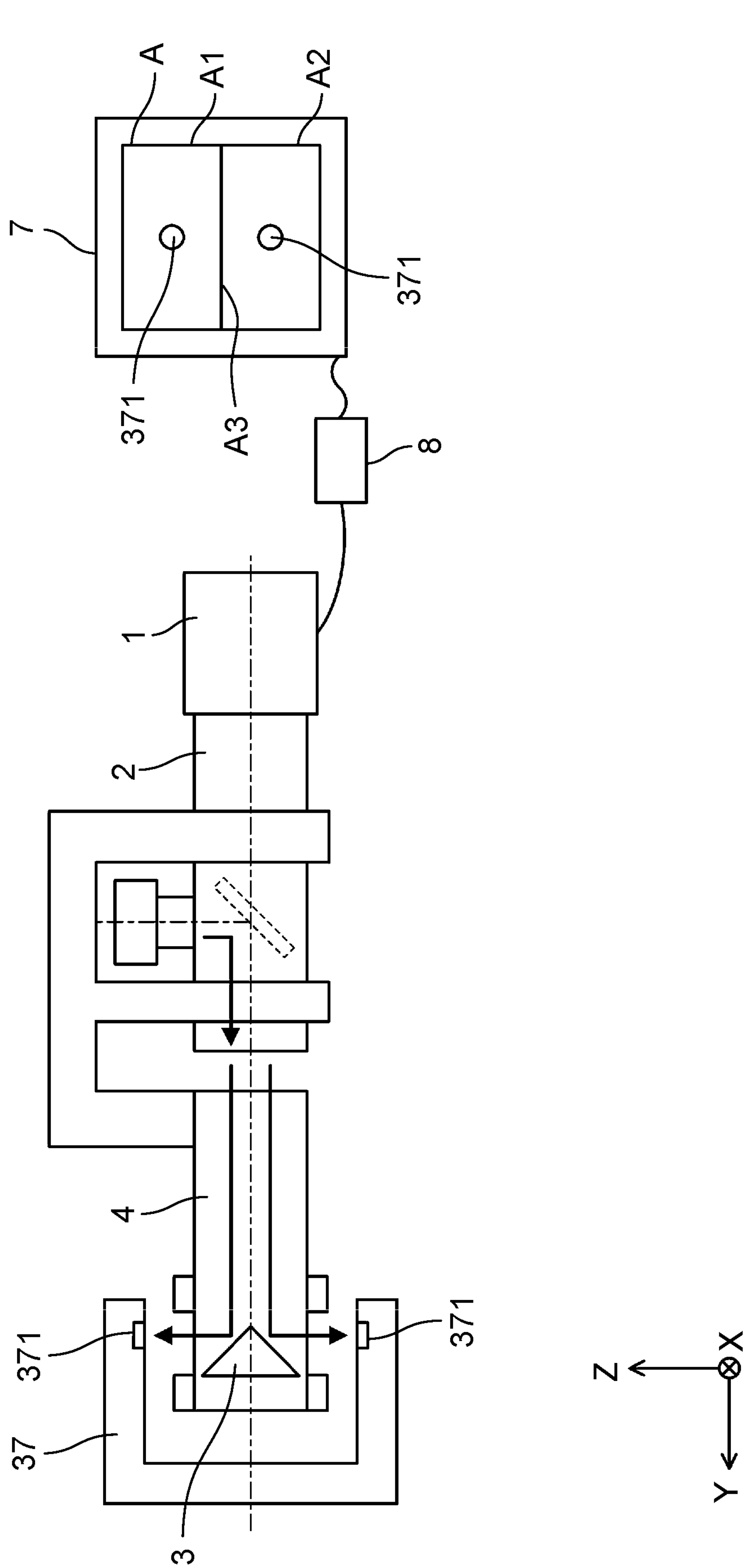
FIG. 11 is a side view of another example of the positioning device according to the third exemplary embodiment.

FIG. 11 illustrates a side view of another example of the positioning device according to the third exemplary embodiment.

In this modification, coaxial confirmation jig 37 (first coaxial confirmation jig) is disposed in order to detect boundary A3 (boundary line 33) of camera image A. Coaxial confirmation jig 37 is disposed so as to sandwich prism 3 in the Z direction. Coaxial confirmation jig 37 is given marks 371 (second marks) disposed at the same position in the X direction and the Y direction.

As illustrated in FIG. 11, in a case where camera 1 performs imaging in a state where coaxial confirmation jig 37 is disposed, two marks 371 are displayed in camera image A. Since two marks 371 are disposed at the same position in the X direction and the Y direction in coaxial confirmation jig 37, it can be estimated that boundary A3 exists in the center between marks 371 in camera image A, and boundary A3 can be detected.

Modification 4

Figure 12:
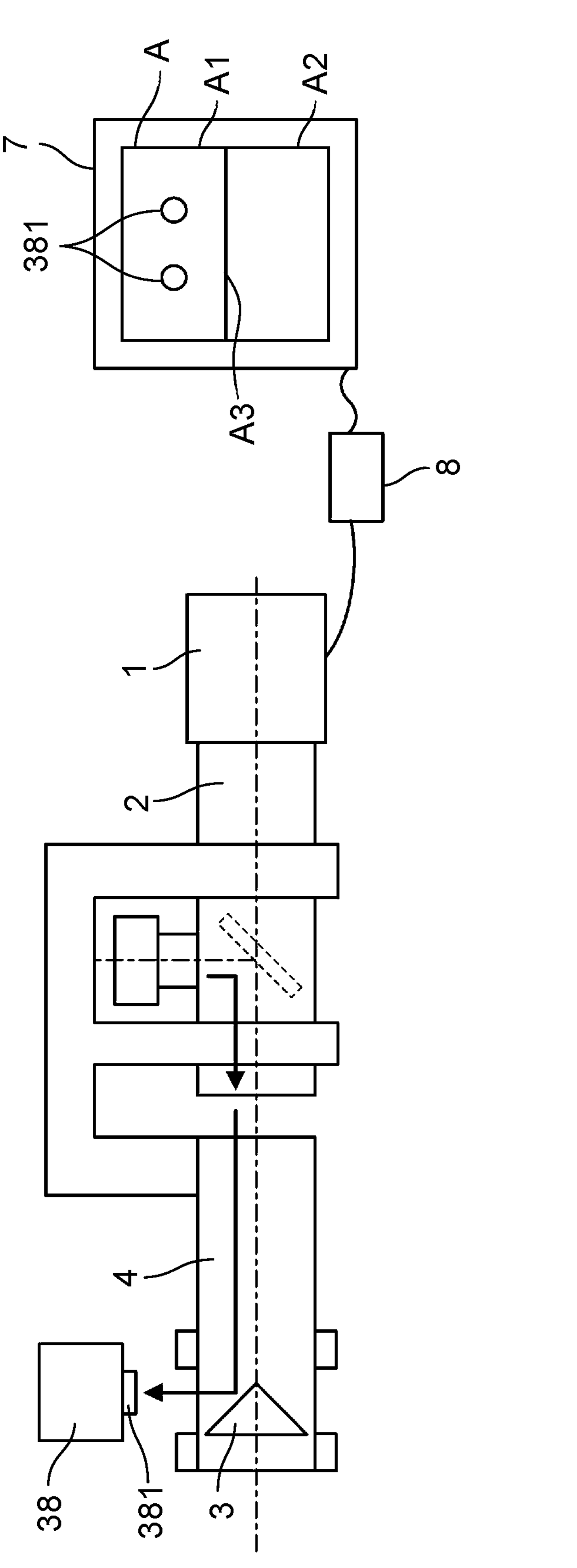
FIG. 12 is a side view of another example of the positioning device according to the third exemplary embodiment.
Figure 12:
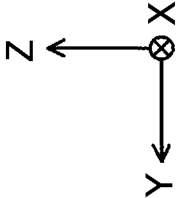

FIG. 12 illustrates a side view of another example of the positioning device according to the third exemplary embodiment.

In this modification, coaxial confirmation jig 38 (second coaxial confirmation jig) is disposed in order to detect boundary A3 (boundary line 33) of camera image A. Coaxial confirmation jig 38 is disposed on joint head 5 side. Coaxial confirmation jig 38 is given two marks 381 (third marks) arranged side by side in the X direction.

In order to detect boundary A3 (boundary line 33) of camera image A, first, camera image A in which boundary A3 and two marks 381 are displayed is imaged in advance, and the initial positions of boundary A3 and two marks 381 are acquired. By comparing the initial positions of two marks 381 with the position of mark 381 imaged thereafter, it is possible to correct the position of boundary A3. Specifically, the relative distance (in FIG. 13, distance Lm) between boundary A3 and the initial positions of two marks 381 is obtained, and it is estimated that boundary A3 exists in a position offset by distance Lm in the perpendicular direction of a straight line from the straight line connecting two marks 381 imaged thereafter. Note that in FIGS. 13(*a*)

to 13(*c*), the boundary before the position correction is indicated by A3, and the boundary after the position correction is indicated by A3'.

Figure 13:
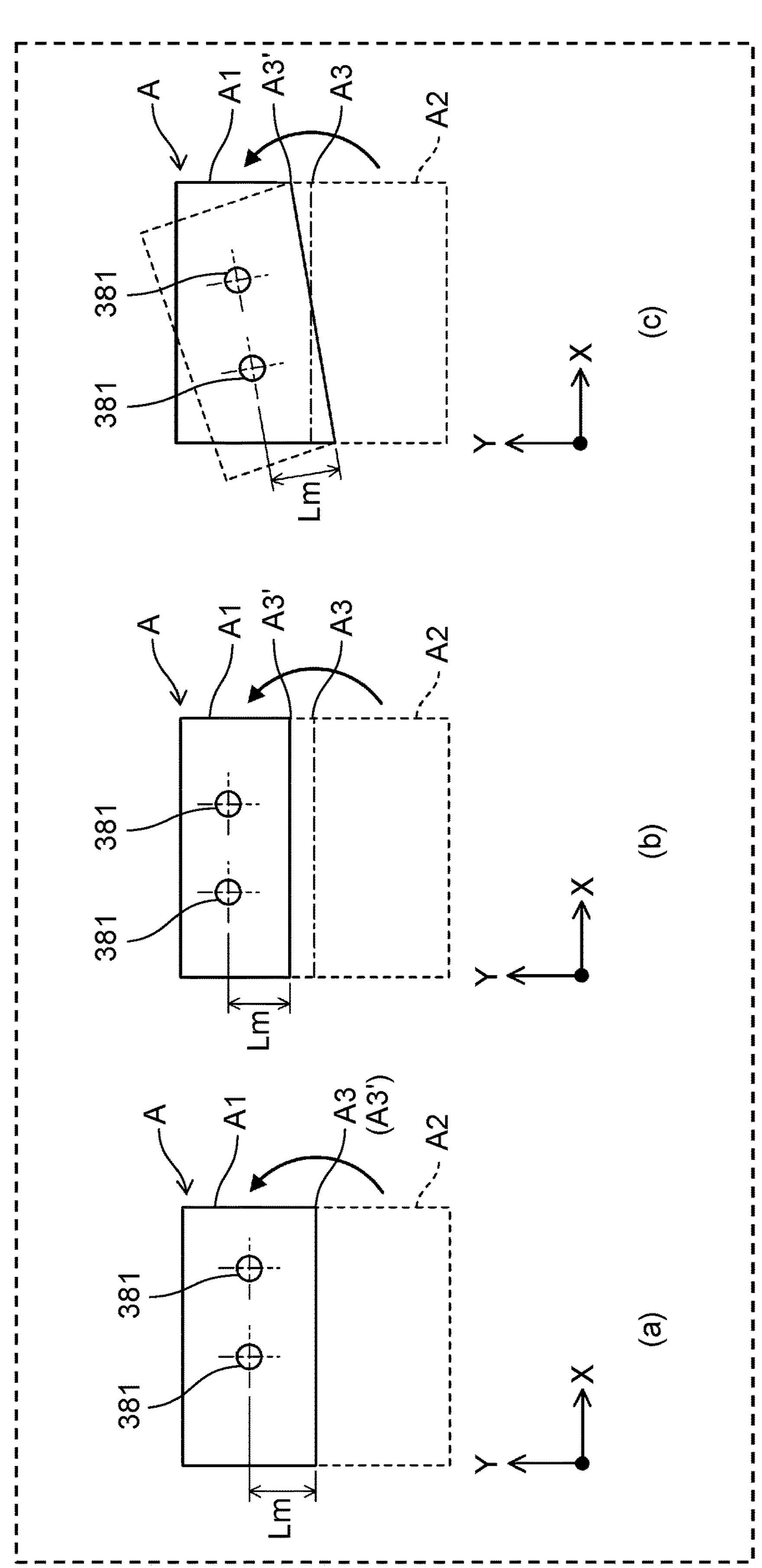
FIG. 13 is a view for explaining boundary detection processing by the positioning device of FIG. 12.

For example, when the optical axis of lens 2 is deviated in the +X direction, two marks 381 are displayed in positions deviated in the +X direction in first image A1 (see FIG. 13(*a*)). In this case, it is estimated that boundary A3' exists in a position offset by distance Lm in the −Y direction of the straight line from the straight line connecting two marks 381.

When the optical axis of lens 2 is deviated in the +Z direction, two marks 381 are displayed in positions deviated in the +Z direction in first image A1 (see FIG. 13(*b*)). In this case, it is estimated that boundary A3' exists in a position offset by distance Lm in the −Z direction of the straight line from the straight line connecting two marks 381.

When the optical axis of lens 2 is deviated in the rotation direction about the Y axis, two marks 381 are displayed in positions deviated in the rotation direction about the center in the drawing in first image A1 (see FIG. 13(*c*)). In this case, it is estimated that boundary A3' exists in a position offset by distance Lm in the perpendicular direction of the straight line from the straight line connecting two marks 381.

By the above processing, boundary A3 can be detected.

Note that, even in a case where prism 3 itself is rotationally deformed, it is possible to improve the detection accuracy of boundary A3 by combining the present modification and the detection method of boundary A3 in another exemplary embodiment (and another modification).

Modification 5

Figure 14:
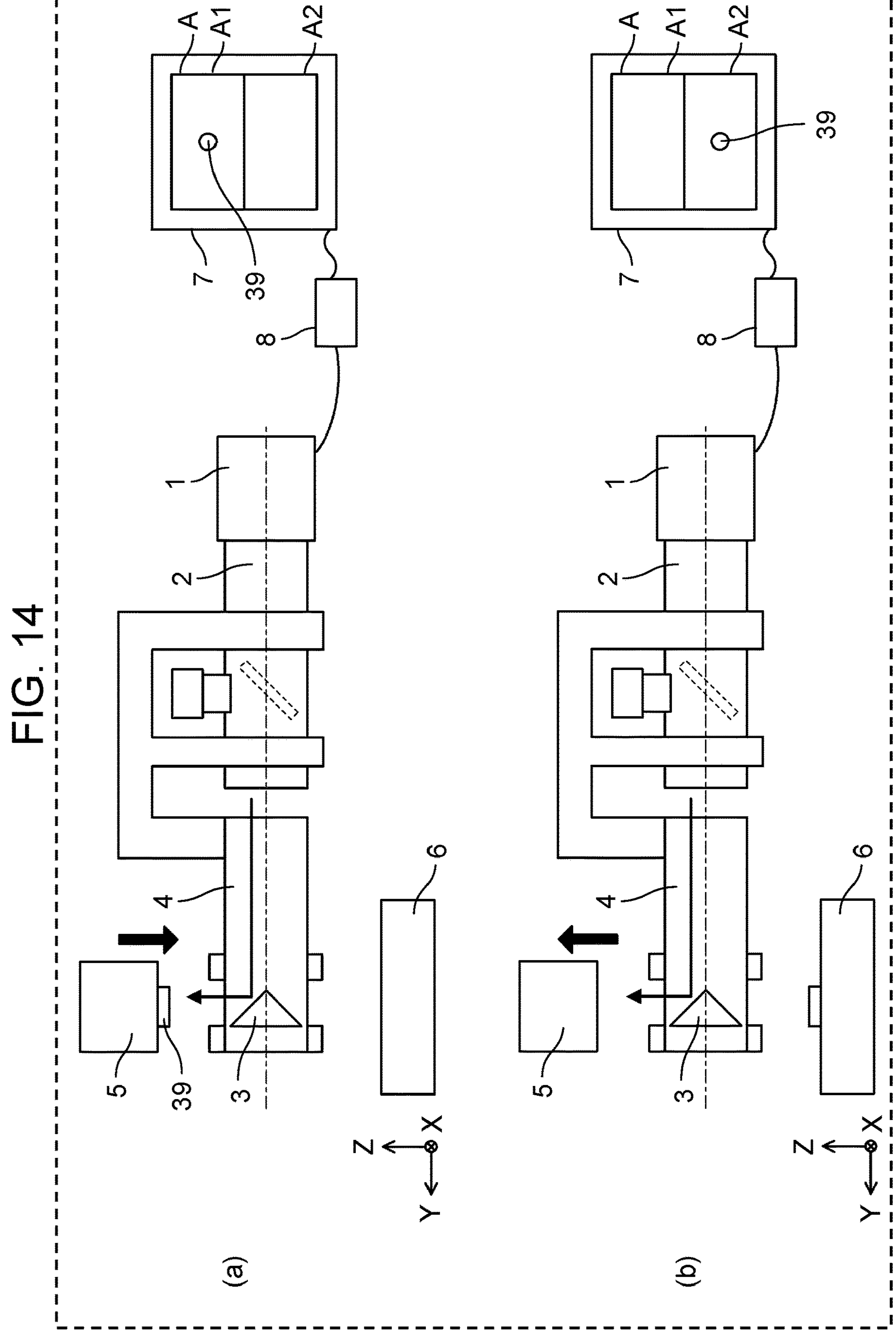
FIG. 14 is a side view of another example of the positioning device according to the third exemplary embodiment.

FIG. 14 illustrates a side view of another example of the positioning device according to the third exemplary embodiment.

In this modification, glass jig 39 is retained by joint head 5 in order to detect boundary A3 (boundary line 33) of camera image A (see FIG. 14(*a*)).

In order to detect boundary A3 (boundary line 33) of camera image A, first, first image A1 is imaged in a state where glass jig 39 is retained by joint head 5. Then, joint head 5 is moved in the Z direction, and second image A2 is imaged in a state where glass jig 39 is placed on stage 6 (see FIG. 14(*b*)). Since it can be estimated that boundary A3 exists in the center position of glass jig 39 displayed in first image A1 and second image A2 at this time, boundary A3 can be detected.

Other Exemplary Embodiments

As described above, the exemplary embodiments have been described as illustrations of the technique disclosed in the present application. However, the technique in the present disclosure is not limited to the exemplary embodiments and is applicable to exemplary embodiments appropriately subjected to changes, replacements, additions, omissions, and the like.

Note that in each of the above exemplary embodiments, when the mounting operation or boundary A3 is detected, joint head 5 sometimes moves in the Z direction toward stage 6. In this case, the optical system (camera 1, lens 2, prism 3, prism retainer 4, and the like) moves (advances and retracts) in the Y direction or the X direction so that joint head 5 does not collide with prism 3. At this time, the entire optical system may be moved, or only prism 3 and prism retainer 4 may be retracted.

Figure 15:
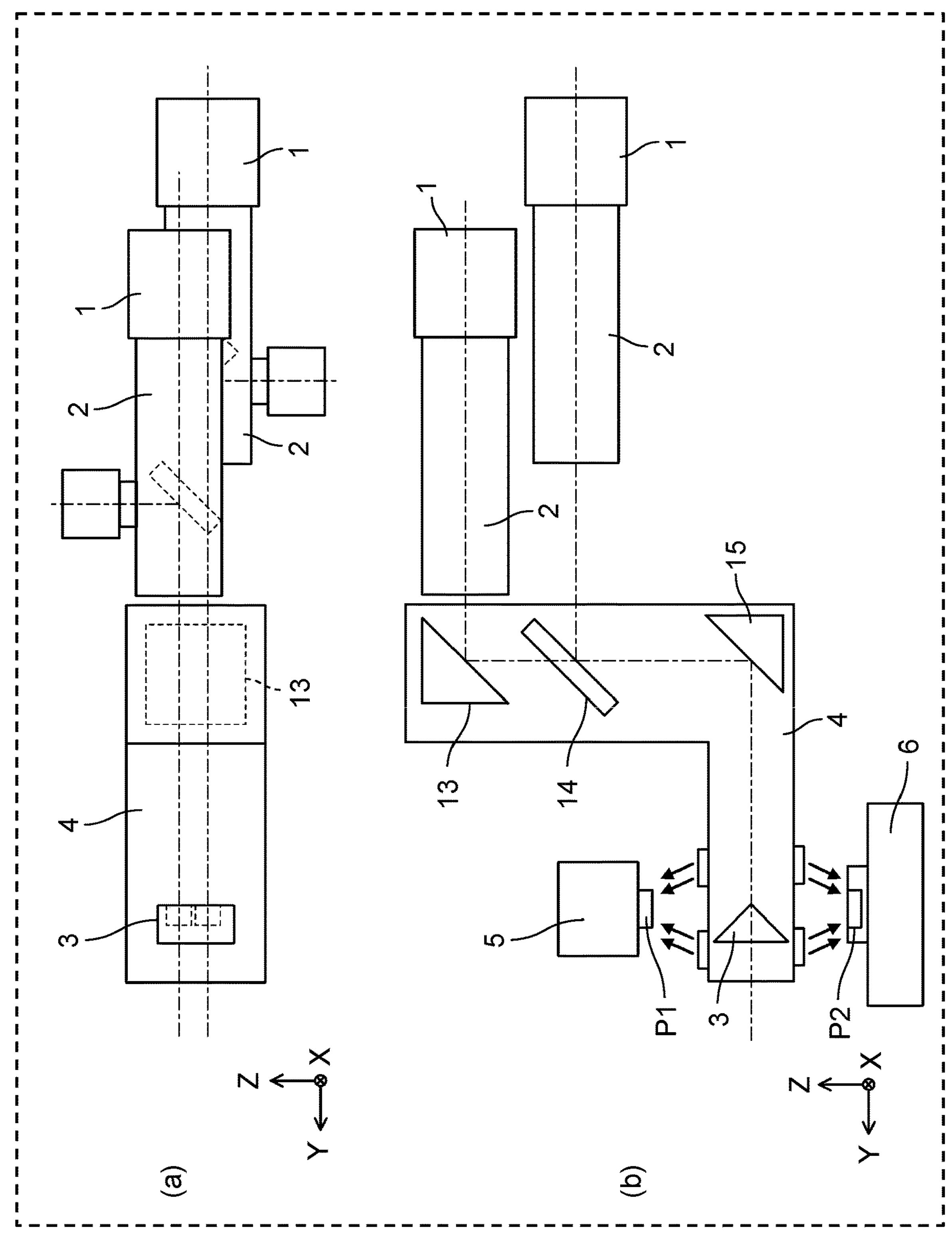
FIG. 15 is a view illustrating a configuration of a positioning device according to another exemplary embodiment.

In each of the above exemplary embodiments, a plurality of optical systems may be provided. FIG. 15(*a*) is a plan view of the positioning device, and FIG. 15(*b*) is a side view of the positioning device. As illustrated in FIG. 15, two cameras 1, two lenses 2, two prisms 3, two prism retainers 4, and the like are included. Upper camera 1 images first component P1 and second component P2 via reflection prism 13, half mirror 14, reflection prism 15, and prism 3. Lower camera 1 images first component P1 and second component P2 via half mirror 14, reflection prism 15, and prism 3. In this configuration, each camera 1 images camera images A in different positions in the X direction. Due to this, since a plurality of parts of a workpiece can be imaged by one time of imaging, manufacturing efficiency can be improved.

INDUSTRIAL APPLICABILITY

The positioning device of the present disclosure can be used when positioning is performed at the time of manufacturing an electronic component or the like.

REFERENCE MARKS IN THE DRAWINGS

- 1 camera
- 2 lens
- 3 prism
- 4 prism retainer
- 5 joint head
- 6 stage
- 8 processor
- 11 coaxial illumination (first illumination)
- 12 oblique light illumination (first illumination)
- 31 first reflection surface
- 32 second reflection surface
- 33 boundary line
- 34 third reflection surface
- 35 mark (first mark)
- 36 reflection plate
- 37 coaxial confirmation jig (first coaxial confirmation jig)
- 371 mark (second mark)
- 38 coaxial confirmation jig (second coaxial confirmation jig)
- 381 mark (third mark)
- A camera image
- A1 first image
- A2 second image
- P1 first component
- P2 second component

The invention claimed is:

1. A positioning device that performs positioning of a first component retained by a joint head and a second component placed on a stage when the first component is mounted on the second component, the positioning device comprising:

a prism including a first reflection surface and a second reflection surface;

a camera; and a processor, wherein in a case where the prism is disposed between the joint head and the stage, the first reflection surface reflects, to a side of the camera, light incident from a side of the joint head, and the second reflection surface reflects, to the side of the camera, light incident from a side of the stage, the camera images a camera image including a first image that is an image on the side of the joint head and a second image that is an image on the side of the stage based on light incident from the prism, and the processor is configured to:

specify a position of a boundary between the first image and the second image in the camera image;

determine, based on the specified position of the boundary, whether correction of a reference position of the boundary is necessary;

when the correction is necessary, correct the reference position of the boundary based on the specified position of the boundary; and perform positioning of the first component and the second component by obtaining a position of the first component and a position of the second component with reference to the boundary at the reference position.

2. The positioning device according to claim 1 further comprising a first light source that irradiates, with light, at least one of the first component retained by the joint head and the second component placed on the stage.

3. The positioning device according to claim 1, further comprising a lens disposed between the camera and the prism, wherein the prism is disposed with a distance between the prism and the first component and a distance between the prism and the second component becoming shorter than a distance between the prism and the lens.

4. The positioning device according to claim 1, further comprising a plurality of the cameras, wherein the plurality of cameras are arranged to image a plurality of the camera images in positions different from one another in the joint head and the stage.

5. The positioning device according to claim 1, wherein the prism is provided with a third reflection surface including a predetermined width between the first reflection surface and the second reflection surface, and the boundary specified by the processor is a boundary corresponding to the third reflection surface between the first image and the second image.

6. A positioning method for performing positioning of a first component and a second component when the first component is mounted on the second component, the positioning method comprising:

retaining the first component by a joint head;

placing the second component on a stage;

disposing a prism between the joint head and the stage;

reflecting, to a side of a camera, light incident from a side of the joint head by a first reflection surface of the prism, and reflecting, to the side of the camera, light incident from a side of the stage by a second reflection surface of the prism;

imaging, by the camera, a camera image including a first image that is an image on the side of the joint head and a second image that is an image on side of the stage based on light incident from the prism; and specifying, by a processor, a position of a boundary between the first image and the second image in the camera image;

determining, by the processor, based on the specified position of the boundary, whether correction of a reference position of the boundary is necessary;

when the correction is necessary, correcting, by the processor, the reference position of the boundary based on the specified position of the boundary; and performing positioning of the first component and the second component by obtaining, by the processor, a position of the first component and a position of the second component with reference to the boundary at the reference position.

7. The positioning method according to claim 6, wherein the processor obtains the position of the first component and the position of the second component based on the camera images in which the first image and the second image are imaged at an identical timing or different timings.

8. The positioning method according to claim 6, wherein the camera images a plurality of the camera images in positions different from one another, and the processor obtains the position of the first component and the position of the second component based on the plurality of camera images.

9. The positioning method according to claim 6 further comprising:

calculating, by the processor, a position correction amount of the first component and a position correction amount of the second component based on the position of the first component and the position of the second component that have been obtained;

moving the joint head and the stage based on the position correction amounts having been calculated;

imaging again, by the camera, the camera image;

obtaining again, by the processor, a position of the first component and a position of the second component based on the camera image, and calculating again the position correction amount of the first component and the position correction amount of the second component; and performing a mounting operation when the position correction amounts again fall within a predetermined value.

10. The positioning method according to claim 6, wherein the prism is provided with a boundary line between the first reflection surface and the second reflection surface, and the boundary specified by the processor is a boundary corresponding to the boundary line between the first image and the second image.

11. The positioning method according to claim 10, wherein the boundary line is formed as a third reflection surface including a predetermined width between the first reflection surface and the second reflection surface.

12. The positioning method according to claim 10, wherein the prism is given a first mark in a position corresponding to the first reflection surface and a position corresponding to the second reflection surface, and the processor specifies the boundary based on the first mark displayed in the camera image.

13. The positioning method according to claim 10, further comprising disposing a second light source on at least one of the side off the joint head and the side of the stage of the prism and irradiating the prism with light by the second light source.

14. The positioning method according to claim 10, further comprising disposing a reflection plate on at least one of the side of the joint head and the side of the stage of the prism and reflecting, to the prism, light incident by the reflection plate.

15. The positioning method according to claim 10, further comprising:

disposing a first coaxial confirmation jig including two second marks that are given side by side in a first direction in which the joint head moves toward the stage when the first component is mounted on the second component, with the two second marks sandwiching the prism; and specifying, by the processor, a position of the boundary based on the camera image in which the two second marks are imaged.

16. The positioning method according to claim 10, further comprising:

disposing a second coaxial confirmation jig given a third mark on any one of the side of the joint head and the side of the stage of the prism, and imaging a first camera image that is the camera image indicating an initial position of the third mark;

after imaging the first camera image, disposing the second coaxial confirmation jig in an identical position to the position where the first camera image is imaged, and imaging again the camera image; and specifying, by the processor, a position of the boundary by comparing positions of the third marks displayed in the first camera image and the camera image imaged again.

17. The positioning method according to claim 10, further comprising:

retaining a jig component by the joint head;

imaging, by the camera, a second camera image indicating the jig component in a state of being retained by the joint head;

placing the jig component on the stage;

imaging, by the camera, a third camera image indicating the jig component in a state of being placed on the stage; and specifying, by the processor, a position of the boundary by comparing positions of the jig components displayed in the second camera image and the third camera image.

* * * * *